United States Patent [19]
Kohno

[11] Patent Number: 4,484,898
[45] Date of Patent: Nov. 27, 1984

[54] TORSIONAL VIBRATION DAMPER

[75] Inventor: Satoshi Kohno, Minami-ashigara, Japan

[73] Assignee: Atsugi Motor Parts Company Limited, Japan

[21] Appl. No.: 442,970

[22] Filed: Nov. 19, 1982

[30] Foreign Application Priority Data

Dec. 16, 1981 [JP] Japan .................................. 56-203153

[51] Int. Cl.$^3$ ............................................... F16D 3/14
[52] U.S. Cl. .................................. 464/64; 192/106.2; 464/68
[58] Field of Search ............... 192/70.17, 106.1, 106.2; 464/64, 66, 68, 81

[56] References Cited

U.S. PATENT DOCUMENTS

| | | | |
|---|---|---|---|
| 4,139,995 | 2/1979 | Lamarche | 464/64 |
| 4,279,132 | 7/1981 | Lamarche | 464/64 |
| 4,304,107 | 12/1981 | Fall et al. | 464/81 X |
| 4,413,711 | 11/1983 | Lamarche | 192/106.2 X |

*Primary Examiner*—Stuart S. Levy
*Assistant Examiner*—Daniel P. Stodola

*Attorney, Agent, or Firm*—Lowe, King, Price & Becker

[57] ABSTRACT

A torsional vibration damper is capable of neutralizing vibrations with a relatively large amplitude, and includes a pair of strengthened equalizers. The damper transmits a torque between a drive plate operatively connected to a torque input member, and hub operatively connected to a torque output member. The hub has a plurality of hub arms extending outward from its outer periphery with an equal angular. A pair of equalizers is journalled on the outer peripheries of and floating independently of said hub arms, each equalizer including an annular portion and arm portions extending inward from the inner periphery of the annular portion. The arm portions of two equalizers alternate between neighboring hub arms. Compression spring sets are interposed in serial between the arm portions of both the equalizers and between the arm portions and the hub arms. The drive plate engages the groups of the compression spring sets by means of both the side inner edges of arcuate windows which are defined in the drive plate and have the same arclength to that of the neighboring hub arms.

5 Claims, 2 Drawing Figures

TORSIONAL VIBRATION DAMPER

BACKGROUND OF THE INVENTION

1. Field of the Invention

The present invention relates to a torsional vibration damper assembled in a clutch for a manual transmission of a vehicle or a lock-up clutch for an automatic transmission thereof comprising a torque converter.

2. Description of the Prior Art

A torsional vibration emanating from a vehicle engine causes undesired vibration, noise, etc. in a torque transmitting system during operation of the vehicle. For the purpose of eliminating the influence of the vibration, it is well known to provide a clutch or a lock-up clutch with a torsional vibration damper using compression springs acting arcuately of a clutch. However, a problem of presently known vibration damper assembly is that the assembly will only allow a relatively small deflection amplitude.

In order to solve the problem, a torsional vibration damper has been provided in that a pair of equalizers including an annular portion is disposed opposing each other at the both end sides of a hub with a plurality of hub arms extending outward. Arm portions extending outward from the annular portion of the equalizers are positioned between neighboring hub arms of the hub, compression spring sets interposed between the arm portions and the hub arms to form groups of spring sets acting in parallel with each group having spring sets acting in series between neighboring hub arms, whereby a drive plate engaging the compression spring sets has a larger relative turning angle.

According to the above torsional vibration damper, a root of the arm portion is inferior in strength since the arm portion of such known equalizer is shaped like a segment expanding outward from the external periphery of the annular portion.

However, if the arcuate width of the root should be expanded in order to strengthen the root, it would make an angular space for accommodating the compression spring sets narrower, to limit the capability of extending travel of the compression spring sets. Consequently, it is impossible to give a relatively high amplitude damping to the damper.

SUMMARY OF THE INVENTION

It is a primary object of the present invention to provide a torsional vibration damper for a relatively high amplitude damping at a low spring constant.

It is another object of the present invention to provide a torsional vibration damper with an equalizer which is sufficient in strength and has a simple shape easily to be manufactured.

It is a further object of the present invention to provide a torsional vibration damper in a thin structure.

According to the present invention, a torsional vibration damper is constructed in such a manner that an annular portion of a pair of equalizers is journalled on the outer peripheries of hub arms, arm portions of one of the equalizers extend taper inward from an inner periphery of the annular portion alternately to the arm portions of another of the equalizers, between neighboring hub arms, and compression spring sets are interposed between the arm portions of the equalizers and between the arm portions and the hub arms, so that a root of the each arm portion may have a larger arcuate width to strengthen the arm portion and so that the inward tapered arm portion may give larger angular width of space for accommodating the compression spring sets to provide the vibration damper with a relatively high amplitude damping.

Also, according to the present invention, the equalizer is manufactured with ease because the arm portions and the annular portion of the equalizer are shaped in the common plane, or because the arm portions of the equalizer are shaped in a plane with a slight deflection from a plane of the annular portion of the equalizer.

Further, according to the present invention, thinness and arrangement of the equalizers make a torsional vibration damper thin in structure.

The features and advantages of the torsional vibration damper of the present invention will be more clearly appreciated from the following description taken in conjunction with the accompanying drawings.

DETAILED DESCRIPTION OF THE PREFERRED EMBODIMENTS

Figure 1:
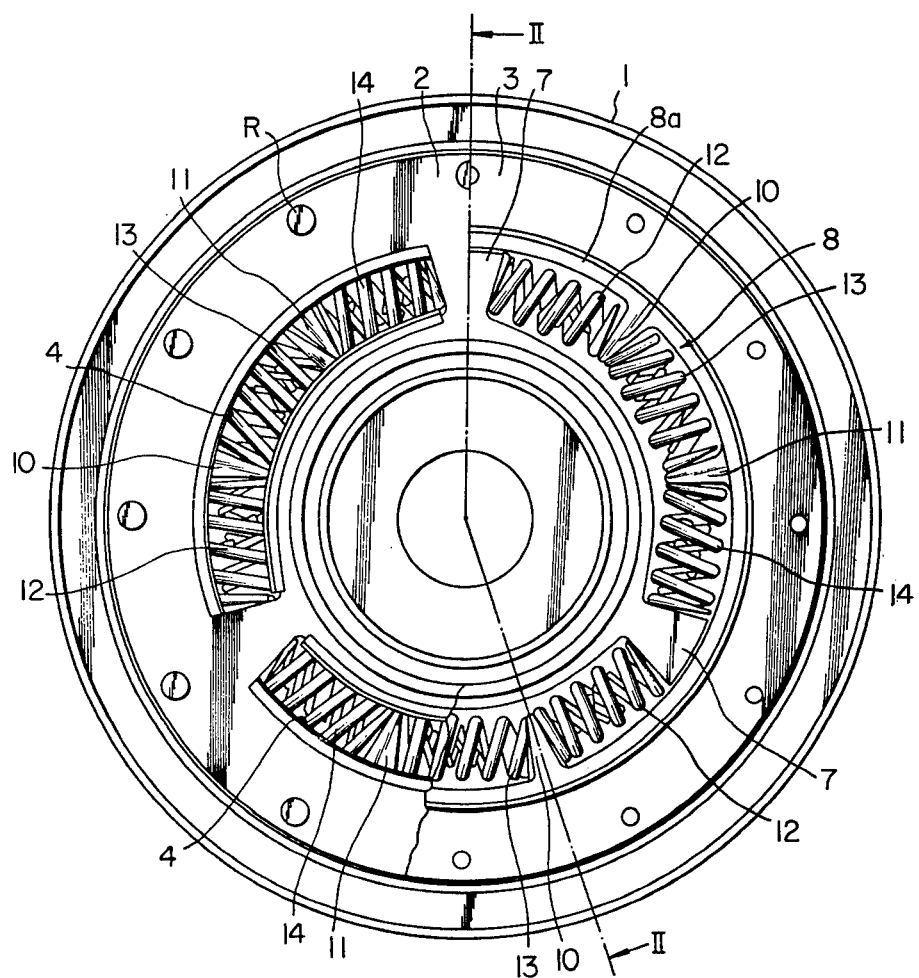
FIG. 1 is a front elevation of a torsional vibration damper according to the present invention, in which a drive plate is partially taken away.
Figure 2:
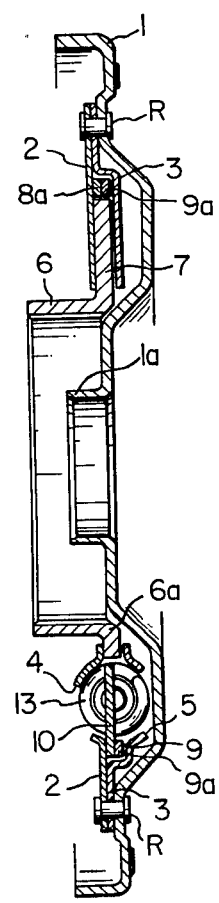
FIG. 2 is a sectional view taken along the line II—II of FIG. 1.

In FIGS. 1 and 2, a drive member 1 is operatively connected to a suitable torque input member (not shown). Drive plate assemblies 2 and 3 are secured together with plural and rivets R and to the drive member 1. The drive plate assembly 2 has three circumferentially equally spaced windows 4.

On the other hand, three windows 5 of which shape is the same to that of the windows 4 are arranged in the drive plate assembly 3, opposing the windows 4. Windows 4 and 5 establish a space for accommodating compression spring sets described below. A hub 6 is connected by means of its spline arrangement with an output member (not shown). The hub 6 has an outward flange 6a and three circumferentially equally spaced hub arms 7 extending radially outwardly from the periphery of the outward flange 6a. The arclength between neighboring hub arms 7 is substantially equal to that of the windows 4 and 5.

A pair of annular equalizers 8 and 9 is provided between the drive plate assemblies 2 and 3 so that each annular portion 8a or 9a of each equalizer 8 or 9 is journalled on the outer peripheries of and floating independently of the hub arms 7, and preferably has substantially ½ the thickness of that of the hub arms 7. The equalizer 8 or 9 comprises an annular portion 8a or 9a, respectively, and three isosceles-triangle-shaped arm portions 10 or 11, in a common plane, the arm portions 10 or 11 extending inward from the inner periphery of the annular portion 8a or 9a with equal angular spaces. The arm portions 10 and 11 are alternately disposed between neighboring hub arms 7 of the hub 6.

There are interposed between the hub arms 7 and the arm portions 10 and 11 three telescopic compression spring sets 12, 13 and 14. The compression spring sets 12, 13 and 14 are seated between one hub arm 7 and the arm portion 10, the arm portion 10 and the arm portion 11, and the arm portion 11 and another hub arm 7, respectively. Therefore, there is no deflection of spring-load between the drive plates 2 and 3, a pair of the floating members 8 and 9, and the hub 6.

As disclosed in prior U.S. Pat. Nos. 4,279,132 and 4,139,995; the springs for the damper are arranged in groups acting in parallel, with the springs in each group acting in series.

In the present application, three groups of spring sets 12, 13 and 14 act in parallel, with the three spring sets of each group acting in series.

In the absence of any torsional vibrations, one end of the compression spring set 12 or 14 contacts at the same time not only one side of the hub arm 7 but also that of the windows 4 and 5 of the drive plate assemblies 2 and 3. While, at the presence of any torsional vibrations, for example, one end of the compression spring set 12 or 14 retains to contact one side of the hub arm 7 and leaves the one side of the windows 4 and 5, and the one end of the compression spring set 14 or 12 retains to contact the one side of the windows 4 and 5 and leaves the one side of the hub arm 7.

In the torque transmitting from the input member to the output member by means of the combination of the drive member 1 and the hub 6, three groups of coiled arcuate compression spring sets act in parallel to each other to ensure torsional rigidity sufficient for the torque transmitting.

In such construction of the torsional vibration damper as above, the torque inputted to the drive member 1 is transmitted to the drive plate assemblies 2 and 3 by means of rivets R, and in turn to the hub 6 by means of a series of the compression spring sets 12, 13 and 14. In the torque transmitting, the total spring constant K of the series of compression spring sets 12, 13 and 14 is, assuming that each spring constant of the compression spring sets 12, 13 and 14 is $K_1$, $K_2$ or $K_3$, formulated as follows;

$$(1/K)=(1/K_1)+(1/K_2)+(1/K_3).$$

Accordingly, the torsional vibration damper is obtained that allows a larger displacement or amplitude of the torsional vibration.

In addition, the arm portions 10 or 11 are connected to the inner periphery of the annular portions 8a or 9a at the bottom line of their isosceles triangle shape, so that the arm portions 10 or 11 may keep wider or strengthened roots to the annular portion 8a or 9a and the sufficient angular space for accommodating the compression spring sets 12, 13 and 14.

In addition, since the equalizers 8 and 9 are journalled adjacent in parallel to each other in such a manner that the annular portions 8a and 9a are journalled on the peripheries of the hub arms 7, the arm portions 10 and 11 of the equalizers 8 and 9 receive spring force of the compression spring sets 12, 13 and 14 of which axes are conventionally aligned with a ½ thickness position of the hub arms 7, substantially on the axes of the compression spring sets 12, 13 and 14, and actually with a slight eccentricity from the axes thereof.

In addition, since the annular portions 8a and 9a of the equalizers 8 and 9 are journalled on the outer peripheries of and floating independently of the hub arms 7, it is possible to reduce the thickness of the torsional vibration damper more than in case the equalizers 8 and 9 should be journalled on the opposite sides of the hub arms 7. Where the thickness of the equalizers 8 and 9 is no more than ½ thickness of the hub arms 7, it results in greater compacting effect.

Although there has been illustrated and discribed specific structures, it is to be clearly understood that the same were merely for the purpose of illustration, and that changes and modifications may readily be made therein by those skilled in the art, without departing from the spirit and scope of the invention.

What is claimed is:

1. A torsional vibration damper to transmit torque between driving and driven members, comprising:
    a drive plate assembly operatively connected to an input member;
    a hub operatively connected to an output member, said hub including a plurality of hub arms extending outward from the outer periphery of the hub at equal circumferentially spaced intervals;
    a pair of equalizers each including an annular portion and a plurality of arm portions, the annular portion being journalled on the outer peripheries of and floating independently of the hub arms, the arm portions each being tapered radially inward from the inner periphery of the annular portion, an arm portion of each said equalizer being disposed between adjacent hub arms;
    said drive plate assembly having a plurality of windows formed therein, each window having substantially the same arclength as an arcuate spacing between adjacent hub arms; and
    compression spring sets interposed between the arm portions of said two equalizers and between the arm portions and the hub arms to establish groups of said compression spring sets acting in parallel, said compression spring sets of each group also acting in series between adjacent hub arms, said drive plate assembly engaging the groups of said compression spring sets by means of inner edges of said windows.

2. A torsional vibration damper of claim 1, wherein the annular portion and arm portions of said equalizers are formed in a common plane.

3. A torsional vibration damper of claim 1, wherein the thickness of each equalizer is generally one half the thickness of the hub arms.

4. A torsional vibration damper of claim 2, wherein the thickness of each equalizer is generally one half the thickness of the hub arms.

5. A torsional vibration damper to transmit torque betweem driving and driven members, comprising a drive plate assembly connected to an input member; a hub connected to an output member, said hub including plural hub arms extending radially outward from the outer periphery of the hub at circumferentially spaced intervals from each other; said drive plate assembly having a plurality of windows formed therein with each window having substantially the same arclength as an arcuate spacing between adjacent hub arms; a pair of equalizers each including an annular portion and a plurality of arm portions, the annular portion being journalled on the outer peripheries of the hub arms so as to float independently relative to the hub arms, the arm portions of said equalizers extending radially inward from the inner periphery of the annular portion with an arm portion of each equalizer being disposed between adjacent hub arms; and compression spring sets interposed between the arm portions of said two equalizers and between the arm portions and hub arms to minimize torsional vibration while transmitting torque between the driving and driven members, the annular portions of said equalizers tending to retain the compression spring sets between the hub and equalizer arm portions.

* * * * *